(12) United States Patent
Chishti

(10) Patent No.: US 9,955,013 B1
(45) Date of Patent: Apr. 24, 2018

(54) TECHNIQUES FOR L3 PAIRING IN A CONTACT CENTER SYSTEM

(71) Applicant: Afiniti Europe Technologies Limited, Cheshire (GB)

(72) Inventor: Zia Chishti, Washington, DC (US)

(73) Assignee: Afiniti Europe Technologies Limited, Cheshire (GB)

( * ) Notice: Subject to any disclaimer, the term of this patent is extended or adjusted under 35 U.S.C. 154(b) by 0 days.

(21) Appl. No.: 15/395,517

(22) Filed: Dec. 30, 2016

(51) Int. Cl.
*H04M 3/51* (2006.01)
*H04M 3/523* (2006.01)

(52) U.S. Cl.
CPC ....... *H04M 3/5232* (2013.01); *H04M 3/5235* (2013.01); *H04M 3/5238* (2013.01)

(58) Field of Classification Search
CPC . H04M 3/5232; H04M 3/5235; H04M 3/5238
See application file for complete search history.

(56) References Cited

U.S. PATENT DOCUMENTS

| | | |
|---|---|---|
| 5,155,763 A | 10/1992 | Bigus et al. |
| 5,206,903 A | 4/1993 | Kohler et al. |
| 5,327,490 A | 7/1994 | Cave |
| 5,537,470 A | 7/1996 | Lee |
| 5,702,253 A | 12/1997 | Bryce et al. |
| 5,825,869 A | 10/1998 | Brooks et al. |
| 5,903,641 A | 5/1999 | Tonisson |
| 5,907,601 A | 5/1999 | David et al. |
| 5,926,538 A | 7/1999 | Deryugin et al. |
| 6,049,603 A | 4/2000 | Schwartz et al. |
| 6,052,460 A | 4/2000 | Fisher et al. |
| 6,064,731 A | 5/2000 | Flockhart et al. |
| 6,088,444 A | 7/2000 | Walker et al. |
| 6,163,607 A | 12/2000 | Bogart et al. |
| 6,222,919 B1 | 4/2001 | Hollatz et al. |
| 6,292,555 B1 | 9/2001 | Okamoto |
| 6,324,282 B1 | 11/2001 | McIllwaine et al. |

(Continued)

FOREIGN PATENT DOCUMENTS

| | | |
|---|---|---|
| AU | 2008349500 C1 | 5/2014 |
| AU | 2009209317 B2 | 5/2014 |

(Continued)

OTHER PUBLICATIONS

Anonymous. (2006) "Performance Based Routing in Profit Call Centers," The Decision Makers' Direct, located at www.decisioncraft.com, Issue Jan. 6, 2012 (3 pages).

(Continued)

*Primary Examiner* — Harry S Hong
(74) *Attorney, Agent, or Firm* — Wilmer Cutler Pickering Hale and Dorr LLP

(57) ABSTRACT

Techniques for L3 pairing in a contact center system are disclosed. In one particular embodiment, the techniques may be realized as a method for L3 pairing in a contact center system comprising determining a minimum amount of agent choice, determining a maximum amount of delay, postponing agent selection until at least one of the following conditions is satisfied: (a) the maximum amount of delay has elapsed; or (b) the minimum amount of agent choice has been reached, and selecting an agent among one or more agents for connection to an available contact within the contact center system.

23 Claims, 6 Drawing Sheets

(56) References Cited

U.S. PATENT DOCUMENTS

| | | | |
|---|---|---|---|
| 6,333,979 B1 | 12/2001 | Bondi et al. | |
| 6,389,132 B1 | 5/2002 | Price | |
| 6,389,400 B1 | 5/2002 | Bushey et al. | |
| 6,408,066 B1 | 6/2002 | Andruska et al. | |
| 6,411,687 B1 | 6/2002 | Bohacek et al. | |
| 6,424,709 B1 | 7/2002 | Doyle et al. | |
| 6,434,230 B1 | 8/2002 | Gabriel | |
| 6,496,580 B1 | 12/2002 | Chack | |
| 6,504,920 B1 | 1/2003 | Okon et al. | |
| 6,519,335 B1 | 2/2003 | Bushnell | |
| 6,535,600 B1 | 3/2003 | Fisher et al. | |
| 6,535,601 B1 | 3/2003 | Flockhart et al. | |
| 6,570,980 B1 | 5/2003 | Baruch | |
| 6,587,556 B1 | 7/2003 | Judkins et al. | |
| 6,603,854 B1 | 8/2003 | Judkins et al. | |
| 6,639,976 B1 | 10/2003 | Shellum et al. | |
| 6,661,889 B1 | 12/2003 | Flockhart et al. | |
| 6,704,410 B1 | 3/2004 | McFarlane et al. | |
| 6,707,904 B1 | 3/2004 | Judkins et al. | |
| 6,714,643 B1 | 3/2004 | Gargeya et al. | |
| 6,744,878 B1* | 6/2004 | Komissarchik | H04M 3/5232 379/265.03 |
| 6,763,104 B1 | 7/2004 | Judkins et al. | |
| 6,774,932 B1 | 8/2004 | Ewing et al. | |
| 6,775,378 B1 | 8/2004 | Villena et al. | |
| 6,798,876 B1 | 9/2004 | Bala | |
| 6,829,348 B1 | 12/2004 | Schroeder et al. | |
| 6,832,203 B1 | 12/2004 | Villena et al. | |
| 6,859,529 B2 | 2/2005 | Duncan et al. | |
| 6,922,466 B1 | 7/2005 | Peterson et al. | |
| 6,937,715 B2 | 8/2005 | Delaney | |
| 6,956,941 B1 | 10/2005 | Duncan et al. | |
| 6,970,821 B1 | 11/2005 | Shambaugh et al. | |
| 6,978,006 B1 | 12/2005 | Polcyn | |
| 7,023,979 B1 | 4/2006 | Wu et al. | |
| 7,039,166 B1 | 5/2006 | Peterson et al. | |
| 7,050,566 B2 | 5/2006 | Becerra et al. | |
| 7,050,567 B1 | 5/2006 | Jensen | |
| 7,062,031 B2 | 6/2006 | Becerra et al. | |
| 7,068,775 B1 | 6/2006 | Lee | |
| 7,092,509 B1 | 8/2006 | Mears et al. | |
| 7,103,172 B2 | 9/2006 | Brown et al. | |
| 7,158,628 B2 | 1/2007 | McConnell et al. | |
| 7,184,540 B2 | 2/2007 | Dezonno et al. | |
| 7,209,549 B2 | 4/2007 | Reynolds et al. | |
| 7,231,032 B2 | 6/2007 | Nevman et al. | |
| 7,231,034 B1 | 6/2007 | Rikhy et al. | |
| 7,236,584 B2 | 6/2007 | Torba | |
| 7,245,716 B2 | 7/2007 | Brown et al. | |
| 7,245,719 B2 | 7/2007 | Kawada et al. | |
| 7,266,251 B2 | 9/2007 | Rowe | |
| 7,269,253 B1 | 9/2007 | Wu et al. | |
| 7,353,388 B1 | 4/2008 | Gilman et al. | |
| 7,398,224 B2 | 7/2008 | Cooper | |
| 7,593,521 B2 | 9/2009 | Becerra et al. | |
| 7,676,034 B1 | 3/2010 | Wu et al. | |
| 7,725,339 B1 | 5/2010 | Aykin | |
| 7,734,032 B1 | 6/2010 | Kiefhaber et al. | |
| 7,826,597 B2 | 11/2010 | Berner et al. | |
| 7,864,944 B2 | 1/2011 | Khouri et al. | |
| 7,899,177 B1 | 3/2011 | Bruening et al. | |
| 7,916,858 B1 | 3/2011 | Heller et al. | |
| 7,940,917 B2 | 5/2011 | Lauridsen et al. | |
| 7,961,866 B1 | 6/2011 | Boutcher et al. | |
| 7,995,717 B2 | 8/2011 | Conway et al. | |
| 8,000,989 B1 | 8/2011 | Kiefhaber et al. | |
| 8,010,607 B2 | 8/2011 | McCormack et al. | |
| 8,094,790 B2 | 1/2012 | Conway et al. | |
| 8,126,133 B1 | 2/2012 | Everingham et al. | |
| 8,140,441 B2 | 3/2012 | Cases et al. | |
| 8,175,253 B2 | 5/2012 | Knott et al. | |
| 8,229,102 B2 | 7/2012 | Knott et al. | |
| 8,249,245 B2 | 8/2012 | Jay et al. | |
| 8,295,471 B2 | 10/2012 | Spottiswoode et al. | |
| 8,300,798 B1 | 10/2012 | Wu et al. | |
| 8,359,219 B2 | 1/2013 | Chishti et al. | |
| 8,433,597 B2 | 4/2013 | Chishti et al. | |
| 8,472,611 B2 | 6/2013 | Chishti | |
| 8,565,410 B2 | 10/2013 | Chishti et al. | |
| 8,634,542 B2 | 1/2014 | Spottiswoode et al. | |
| 8,644,490 B2 | 2/2014 | Stewart | |
| 8,670,548 B2 | 3/2014 | Xie et al. | |
| 8,699,694 B2 | 4/2014 | Chishti et al. | |
| 8,712,821 B2 | 4/2014 | Spottiswoode | |
| 8,718,271 B2 | 5/2014 | Spottiswoode | |
| 8,724,797 B2 | 5/2014 | Chishti et al. | |
| 8,731,178 B2 | 5/2014 | Chishti et al. | |
| 8,737,595 B2 | 5/2014 | Chishti et al. | |
| 8,750,488 B2 | 6/2014 | Spottiswoode et al. | |
| 8,761,380 B2 | 6/2014 | Kohler et al. | |
| 8,781,100 B2 | 7/2014 | Spottiswoode et al. | |
| 8,781,106 B2 | 7/2014 | Afzal | |
| 8,792,630 B2 | 7/2014 | Chishti et al. | |
| 8,824,658 B2 | 9/2014 | Chishti | |
| 8,831,207 B1* | 9/2014 | Agarwal | H04M 3/5191 379/265.05 |
| 8,879,715 B2 | 11/2014 | Spottiswoode et al. | |
| 8,903,079 B2 | 12/2014 | Xie et al. | |
| 8,913,736 B2 | 12/2014 | Kohler et al. | |
| 8,929,537 B2 | 1/2015 | Chishti et al. | |
| 8,938,063 B1 | 1/2015 | Hackbarth et al. | |
| 8,995,647 B2 | 3/2015 | Li et al. | |
| 9,020,137 B2 | 4/2015 | Chishti et al. | |
| 9,025,757 B2 | 5/2015 | Spottiswoode et al. | |
| 9,277,055 B2 | 3/2016 | Spottiswoode et al. | |
| 9,300,802 B1* | 3/2016 | Chishti | H04M 3/5232 |
| 9,426,296 B2 | 8/2016 | Chishti et al. | |
| 2001/0032120 A1 | 10/2001 | Stuart et al. | |
| 2002/0018554 A1 | 2/2002 | Jensen et al. | |
| 2002/0046030 A1 | 4/2002 | Haritsa et al. | |
| 2002/0059164 A1 | 5/2002 | Shtivelman | |
| 2002/0082736 A1 | 6/2002 | Lech et al. | |
| 2002/0110234 A1 | 8/2002 | Walker et al. | |
| 2002/0111172 A1 | 8/2002 | DeWolf et al. | |
| 2002/0131399 A1 | 9/2002 | Philonenko | |
| 2002/0138285 A1 | 9/2002 | DeCotiis et al. | |
| 2002/0143599 A1 | 10/2002 | Nourbakhsh et al. | |
| 2002/0161765 A1 | 10/2002 | Kundrot et al. | |
| 2002/0184069 A1 | 12/2002 | Kosiba et al. | |
| 2002/0196845 A1 | 12/2002 | Richards et al. | |
| 2003/0002653 A1 | 1/2003 | Uckun | |
| 2003/0081757 A1 | 5/2003 | Mengshoel et al. | |
| 2003/0095652 A1 | 5/2003 | Mengshoel et al. | |
| 2003/0169870 A1 | 9/2003 | Stanford | |
| 2003/0174830 A1 | 9/2003 | Boyer et al. | |
| 2003/0217016 A1 | 11/2003 | Pericle | |
| 2004/0028211 A1 | 2/2004 | Culp et al. | |
| 2004/0057416 A1 | 3/2004 | McCormack | |
| 2004/0096050 A1 | 5/2004 | Das et al. | |
| 2004/0098274 A1 | 5/2004 | Dezonno et al. | |
| 2004/0101127 A1 | 5/2004 | Dezonno et al. | |
| 2004/0109555 A1 | 6/2004 | Williams | |
| 2004/0133434 A1 | 7/2004 | Szlam et al. | |
| 2004/0210475 A1 | 10/2004 | Starnes et al. | |
| 2004/0230438 A1 | 11/2004 | Pasquale et al. | |
| 2004/0267816 A1 | 12/2004 | Russek | |
| 2005/0013428 A1 | 1/2005 | Walters | |
| 2005/0043986 A1 | 2/2005 | McConnell et al. | |
| 2005/0047581 A1 | 3/2005 | Shaffer et al. | |
| 2005/0047582 A1 | 3/2005 | Shaffer et al. | |
| 2005/0071223 A1 | 3/2005 | Jain et al. | |
| 2005/0129212 A1 | 6/2005 | Parker | |
| 2005/0135593 A1 | 6/2005 | Becerra et al. | |
| 2005/0135596 A1 | 6/2005 | Zhao | |
| 2005/0187802 A1 | 8/2005 | Koeppel | |
| 2005/0195960 A1 | 9/2005 | Shaffer et al. | |
| 2005/0286709 A1 | 12/2005 | Horton et al. | |
| 2006/0098803 A1 | 5/2006 | Bushey et al. | |
| 2006/0110052 A1 | 5/2006 | Finlayson | |
| 2006/0124113 A1 | 6/2006 | Roberts | |
| 2006/0184040 A1 | 8/2006 | Keller et al. | |
| 2006/0222164 A1* | 10/2006 | Contractor | H04M 3/5232 379/265.05 |
| 2006/0233346 A1 | 10/2006 | McIlwaine et al. | |

(56) References Cited

U.S. PATENT DOCUMENTS

| | | |
|---|---|---|
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1 | 3/2007 | Flockhart et al. |
| 2007/0121602 A1 | 5/2007 | Sin et al. |
| 2007/0121829 A1 | 5/2007 | Tal et al. |
| 2007/0136342 A1 | 6/2007 | Singhai et al. |
| 2007/0153996 A1* | 7/2007 | Hansen .............. H04M 3/5237 379/114.29 |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0274502 A1 | 11/2007 | Brown |
| 2008/0002823 A1 | 1/2008 | Fama et al. |
| 2008/0008309 A1* | 1/2008 | Dezonno ............. H04M 3/5232 379/265.02 |
| 2008/0046386 A1 | 2/2008 | Pieraccinii et al. |
| 2008/0065476 A1 | 3/2008 | Klein et al. |
| 2008/0118052 A1 | 5/2008 | Houmaidi et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0205611 A1* | 8/2008 | Jordan ................ H04M 3/5232 379/112.04 |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0245493 A1 | 10/2009 | Chen et al. |
| 2009/0304172 A1 | 12/2009 | Becerra et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1 | 3/2010 | Afzal |
| 2010/0054453 A1 | 3/2010 | Stewart |
| 2010/0086120 A1 | 4/2010 | Brussat et al. |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142698 A1 | 6/2010 | Spottiswoode et al. |
| 2010/0158238 A1 | 6/2010 | Saushkin |
| 2010/0183138 A1 | 7/2010 | Spottiswoode et al. |
| 2011/0022357 A1 | 1/2011 | Vock et al. |
| 2011/0031112 A1 | 2/2011 | Birang et al. |
| 2011/0069821 A1 | 3/2011 | Korolev et al. |
| 2011/0125048 A1 | 5/2011 | Causevic et al. |
| 2012/0051536 A1 | 3/2012 | Chishti et al. |
| 2012/0051537 A1 | 3/2012 | Chishti et al. |
| 2012/0224680 A1 | 9/2012 | Spottiswoode et al. |
| 2012/0278136 A1 | 11/2012 | Flockhart et al. |
| 2013/0003959 A1 | 1/2013 | Nishikawa et al. |
| 2013/0251137 A1 | 9/2013 | Chishti et al. |
| 2013/0287202 A1 | 10/2013 | Flockhart et al. |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2014/0119533 A1* | 5/2014 | Spottiswoode ....... H04M 3/523 379/265.11 |
| 2014/0341370 A1 | 11/2014 | Li et al. |
| 2015/0055772 A1 | 2/2015 | Klemm et al. |

FOREIGN PATENT DOCUMENTS

| | | |
|---|---|---|
| AU | 2009311534 B2 | 8/2014 |
| CN | 102301688 B | 5/2014 |
| CN | 102017591 B | 11/2014 |
| EP | 0 493 292 A2 | 7/1992 |
| EP | 0 949 793 A1 | 10/1999 |
| EP | 1 032 188 A1 | 8/2000 |
| JP | 11-098252 A | 4/1999 |
| JP | 2000-078291 A | 3/2000 |
| JP | 2000-078292 A | 3/2000 |
| JP | 2000-092213 A | 3/2000 |
| JP | 2000-236393 A | 8/2000 |
| JP | 2001-292236 A | 10/2001 |
| JP | 2001-518753 A | 10/2001 |
| JP | 2002-297900 A | 10/2002 |
| JP | 3366565 B2 | 1/2003 |
| JP | 2003-187061 A | 7/2003 |
| JP | 2004-056517 A | 2/2004 |
| JP | 2004-227228 A | 8/2004 |
| JP | 2006-345132 A | 12/2006 |
| JP | 2007-324708 A | 12/2007 |
| JP | 2011-511533 A | 4/2011 |
| JP | 2011-511536 A | 4/2011 |
| JP | 5421928 B2 | 2/2014 |
| JP | 5631326 B2 | 11/2014 |
| JP | 5649575 B2 | 1/2015 |
| MX | 316118 | 12/2013 |
| MX | 322251 | 7/2014 |
| NZ | 587100 B | 10/2013 |
| NZ | 587101 B | 10/2013 |
| NZ | 591486 B | 1/2014 |
| NZ | 592781 B | 3/2014 |
| PH | 1-2010-501704 | 2/2014 |
| PH | 1-2010-501705 | 2/2015 |
| WO | WO-1999/017517 A1 | 4/1999 |
| WO | WO-2001/063894 A2 | 8/2001 |
| WO | WO-2006/124113 A2 | 11/2006 |
| WO | WO-2010/053701 A2 | 5/2010 |
| WO | WO-2011/081514 A1 | 7/2011 |

OTHER PUBLICATIONS

Canadian Office Action issued in Canadian Patent Application No. 2713526, dated Oct. 25, 2016, 7 pages.

Cleveland, William S., "Robust Locally Weighted Regression and Smoothing Scatterplots," Journal of the American Statistical Association, vol. 74, No. 368, pp. 829-836 (Dec. 1979).

Gans, N. et al. (2003), "Telephone Call Centers: Tutorial, Review and Research Prospects," Manufacturing & Service Operations Management, vol. 5, No. 2, pp. 79-141, 84 pages.

International Search Report and Written Opinion issued by the European Patent Office as International Searching Authority for International Application No. PCT/IB2016/001762 dated Feb. 20, 2017 (15 pages).

International Preliminary Report on Patentability issued in connection with PCT Application No. PCT/US2009/066254 dated Jun. 14, 2011 (6 pages).

International Search Report and Written Opinion issued by the European Patent Office as International Searching Authority for International Application No. PCT/IB2016/001776 dated Mar. 3, 2017 (16 pages).

International Search Report issued in connection with International Application No. PCT/US13/33268 dated May 31, 2013 (2 pages).

International Search Report issued in connection with PCT Application No. PCT/US/2009/054352 dated Mar. 12, 2010, 5 pages.

International Search Report issued in connection with PCT Application No. PCT/US2008/077042 dated Mar. 13, 2009 (3 pages).

International Search Report issued in connection with PCT Application No. PCT/US2009/031611 dated Jun. 3, 2009 (5 pages).

International Search Report issued in connection with PCT Application No. PCT/US2009/066254 dated Feb. 24, 2010 (4 pages).

International Search Report issued in connection with PCT/US2009/061537 dated Jun. 7, 2010 (5 pages).

(56) References Cited

OTHER PUBLICATIONS

International Search Report issued in connection with PCT/US2013/033261 dated Jun. 14, 2013 (3 pages).
International Search Report issued in connection with PCT/US2013/33265 dated Jul. 9, 2013 (2 pages).
Japanese Office Action issued by the Japan Patent Office for Application No. 2015-503396 dated Jun. 29, 2016 (7 pages).
Koole, G. (2004). "Performance Analysis and Optimization in Customer Contact Centers," Proceedings of the Quantitative Evaluation of Systems, First International Conference, Sep. 27-30, 2004 (4 pages).
Koole, G. et al. (Mar. 6, 2006). "An Overview of Routing and Staffing Algorithms in Multi-Skill Customer Contact Centers," Manuscript, 42 pages.
Ntzoufras, "Bayesian Modeling Using Winbugs". Wiley Interscience, Chapter 5, Normal Regression Models, Oct. 18, 2007, pp. 155-220 (67 pages).
Press, W. H. and Rybicki, G. B., "Fast Algorithm for Spectral Analysis of Unevenly Sampled Data," The Astrophysical Journal, vol. 338, pp. 277-280 (Mar. 1, 1989).
Riedmiller, M. et al. (1993). "A Direct Adaptive Method for Faster Back Propagation Learning: The RPROP Algorithm," 1993 IEEE International Conference on Neural Networks, San Francisco, CA, Mar. 28-Apr. 1, 1993, 1:586-591.
Stanley et al., "Improving call center operations using performance-based routing strategies," Calif. Journal of Operations Management, 6(1), 24-32, Feb. 2008; retrieved from http://userwww.sfsu.edu/saltzman/Publist.html.
Subsequent Substantive Examination Report issued in connection with Philippines Application No. 1-2010-501705 dated Jul. 14, 2014 (1 page).
Substantive Examination Report issued in connection with Philippines Application No. 1/2011/500868 dated May 2, 2014 (1 page).
Written Opinion of the International Searching Authority issued in connection with PCT Application No. PCT/US2008/077042 dated Mar. 13, 2009, 6 pages.
Written Opinion of the International Searching Authority issued in connection with International Application No. PCT/US13/33268 dated May 31, 2013, 7 pages.
Written Opinion of the International Searching Authority issued in connection with PCT Application No. PCT/US/2009/054352 dated Mar. 12, 2010, 5 pages.
Written Opinion of the International Searching Authority issued in connection with PCT Application No. PCT/US2009/031611 dated Jun. 3, 2009, 7 pages.
Written Opinion of the International Searching Authority issued in connection with PCT Application No. PCT/US2009/066254 dated Feb. 24, 2010, 5 pages.
Written Opinion of the International Searching Authority issued in connection with PCT/US2009/061537 dated Jun. 7, 2010, 10 pages.
Written Opinion of the International Searching Authority issued in connection with PCT/US2013/033261 dated Jun. 14, 2013, 7 pages.
Written Opinion of the International Searching Authority issued in connection with PCT/US2013/33265 dated Jul. 9, 2013, 7 pages.
International Search Report and Written Opinion issued by the U.S. Patent and Trademark Office as International Searching Authority for International Application No. PCT/US17/66988 dated Jan. 29, 2018 (13 pages).

\* cited by examiner

TECHNIQUES FOR L3 PAIRING IN A CONTACT CENTER SYSTEM

FIELD OF THE DISCLOSURE

This disclosure generally relates to pairing contacts and agents in contact centers and, more particularly, to techniques for L3 pairing in a contact center system.

BACKGROUND OF THE DISCLOSURE

A typical contact center algorithmically assigns contacts arriving at the contact center to agents available to handle those contacts. At times, the contact center may have agents available and waiting for assignment to inbound or outbound contacts (e.g., telephone calls, Internet chat sessions, email). At other times, the contact center may have contacts waiting in one or more queues for an agent to become available for assignment.

In some typical contact centers, contacts are assigned to agents based on time of arrival, and agents receive contacts based on the time when those agents became available. This strategy may be referred to as a "first-in, first-out," "FIFO," or "round-robin" strategy. In other typical contact centers, other strategies may be used, such as "performance-based routing," or a "PBR," strategy.

Typical contact centers preferentially minimize overall agent idle time and overall contact waiting time. To that end, if contacts are waiting in a queue, a contact will be assigned to an agent soon after an agent becomes available for assignment. Similarly, if agents are idle, waiting for contacts to arrive, an agent will be assigned to a contact soon after a contact becomes available for assignment.

However, if a contact center uses a pairing strategy that is designed to choose among multiple possible pairings, it may be inefficient to choose the first available pairing for the sake of minimizing contact hold time or agent idle time.

In view of the foregoing, it may be understood that there may be a need for a system that enables improving the amount of choice available to improve the efficiency and performance of pairing strategies that are designed to choose among multiple possible pairings.

SUMMARY OF THE DISCLOSURE

Techniques for L3 pairing in a contact center system are disclosed. In one particular embodiment, the techniques may be realized as a method for L3 pairing in a contact center system comprising determining, by at least one computer processor configured to operate in the contact center system, a minimum amount of agent choice. The method may also comprise determining, by the at least one computer processor, a maximum amount of delay. The method may further comprise postponing agent selection, by the at least one computer processor, until at least one of the following conditions is satisfied: (a) the maximum amount of delay has elapsed; or (b) the minimum amount of agent choice has been reached. The method may additionally comprise selecting, by the at least one computer processor, an agent among one or more agents for connection to an available contact within the contact center system.

In accordance with other aspects of this particular embodiment, the maximum amount of delay is less than 30 seconds and/or the minimum amount of agent choice is greater than three available agents.

In accordance with other aspects of this particular embodiment, selecting the agent may comprise applying a behavioral pairing strategy.

In accordance with other aspects of this particular embodiment, the available contact may be one contact of a plurality of contacts waiting for assignment to an agent.

In another particular embodiment, the techniques may be realized as a method for L3 pairing in a contact center system comprising determining, by at least one computer processor configured to operate in the contact center system, a minimum amount of contact choice. The method may also comprise determining, by the at least one computer processor, a maximum amount of delay. The method may further comprise postponing contact selection, by the at least one computer processor, until at least one of the following conditions is satisfied: (a) the maximum amount of delay has elapsed; or (b) the minimum amount of contact choice has been reached. The method may additionally comprise selecting, by the at least one computer processor, a contact among one or more contacts for connection to an available agent within the contact center system.

In accordance with other aspects of this particular embodiment, the maximum amount of delay is less than 30 seconds and/or the minimum amount of contact choice is greater than three contacts waiting for assignment.

In accordance with other aspects of this particular embodiment, selecting the contact may comprise applying a behavioral pairing strategy.

In accordance with other aspects of this particular embodiment, the available agent may be one agent of a plurality of agents waiting for assignment to a contact.

In another particular embodiment, the techniques may be realized as a method for L3 pairing in a contact center system comprising determining, by at least one computer processor configured to operate in the contact center system, a maximum amount of delay. The method may also comprise determining, by the at least one computer processor, a first score of a first preferred pairing between a first agent and a first contact. The method may further comprise postponing pairing selection, by the at least one computer processor, until at least one of the following conditions is satisfied: (a) the maximum amount of delay has elapsed; or (b) an arrival of at least a second agent or at least a second contact that results in an emergence of a second preferred pairing better than the first preferred pairing. The method may additionally comprise selecting, by the at least one computer processor, the second preferred pairing for connection within the contact center system.

In accordance with other aspects of this particular embodiment, the maximum amount of delay is less than 30 seconds.

In accordance with other aspects of this particular embodiment, determining the first and second preferred pairings may comprise applying a behavioral pairing strategy.

In accordance with other aspects of this particular embodiment, arrival of the second agent and the second contact may result in the emergence of the second preferred pairing consisting of the second agent and the second contact.

In accordance with other aspects of this particular embodiment, arrival of the second agent may result in the emergence of the second preferred pairing consisting of the second agent and the first contact.

In accordance with other aspects of this particular embodiment, arrival of the second contact may result in the emergence of the second preferred pairing consisting of the second contact and an agent different from the first agent that was already available.

In another particular embodiment, the techniques may be realized as a system for L3 pairing in a contact center system comprising at least one computer processor configured to operate in the contact center system, wherein the at least one computer processor is further configured to perform the above method steps.

In another particular embodiment, the techniques may be realized as an article of manufacture for L3 pairing in a contact center system comprising a non-transitory computer processor readable medium, and instructions stored on the medium, wherein the instructions may be configured to be readable from the medium by at least one computer processor configured to operate in the contact center system and thereby cause the at least one computer processor to operate so as to perform the above method steps.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

One example of a pairing strategy that is designed to choose among multiple possible pairings is a "behavioral pairing" or "BP" strategy, under which contacts and agents may be deliberately (preferentially) paired in a fashion that enables the assignment of subsequent contact-agent pairs such that when the benefits of all the assignments under a BP strategy are totaled they may exceed those of FIFO and other strategies such as performance-based routing ("PBR") strategies. BP is designed to encourage balanced utilization of agents within a skill queue while nevertheless simultaneously improving overall contact center performance beyond what FIFO or PBR methods will allow. This is a remarkable achievement inasmuch as BP acts on the same calls and same agents as FIFO and PBR methods, utilizes agents approximately evenly as FIFO provides, and yet improves overall contact center performance. BP is described in, e.g., U.S. Pat. No. 9,300,802, which is incorporated by reference herein. Additional information about these and other features regarding pairing or matching modules using BP strategies (sometimes also referred to as "satisfaction mapping," "SATMAP," "routing system," "routing engine," etc.) is described in, for example, U.S. Pat. No. 8,879,715, which is incorporated herein by reference.

In some embodiments, a contact center may switch (or "cycle") periodically among at least two different pairing strategies (e.g., between FIFO and an L3 pairing strategy). Additionally, the outcome of each contact-agent interaction may be recorded along with an identification of which pairing strategy (e.g., FIFO, or BP enabled with L3) had been used to assign that particular contact-agent pair. By tracking which interactions produced which results, the contact center may measure the performance attributable to a first strategy (e.g., FIFO) and the performance attributable to a second strategy (e.g., BP with L3). In this way, the relative performance of one strategy may be benchmarked against the other. The contact center may, over many periods of switching between different pairing strategies, more reliably attribute performance gain to one strategy or the other. Benchmarking pairing strategies is described in, e.g., U.S. patent application Ser. No. 15/131,915, filed Apr. 18, 2016, which is incorporated herein by reference.

Figure 1:
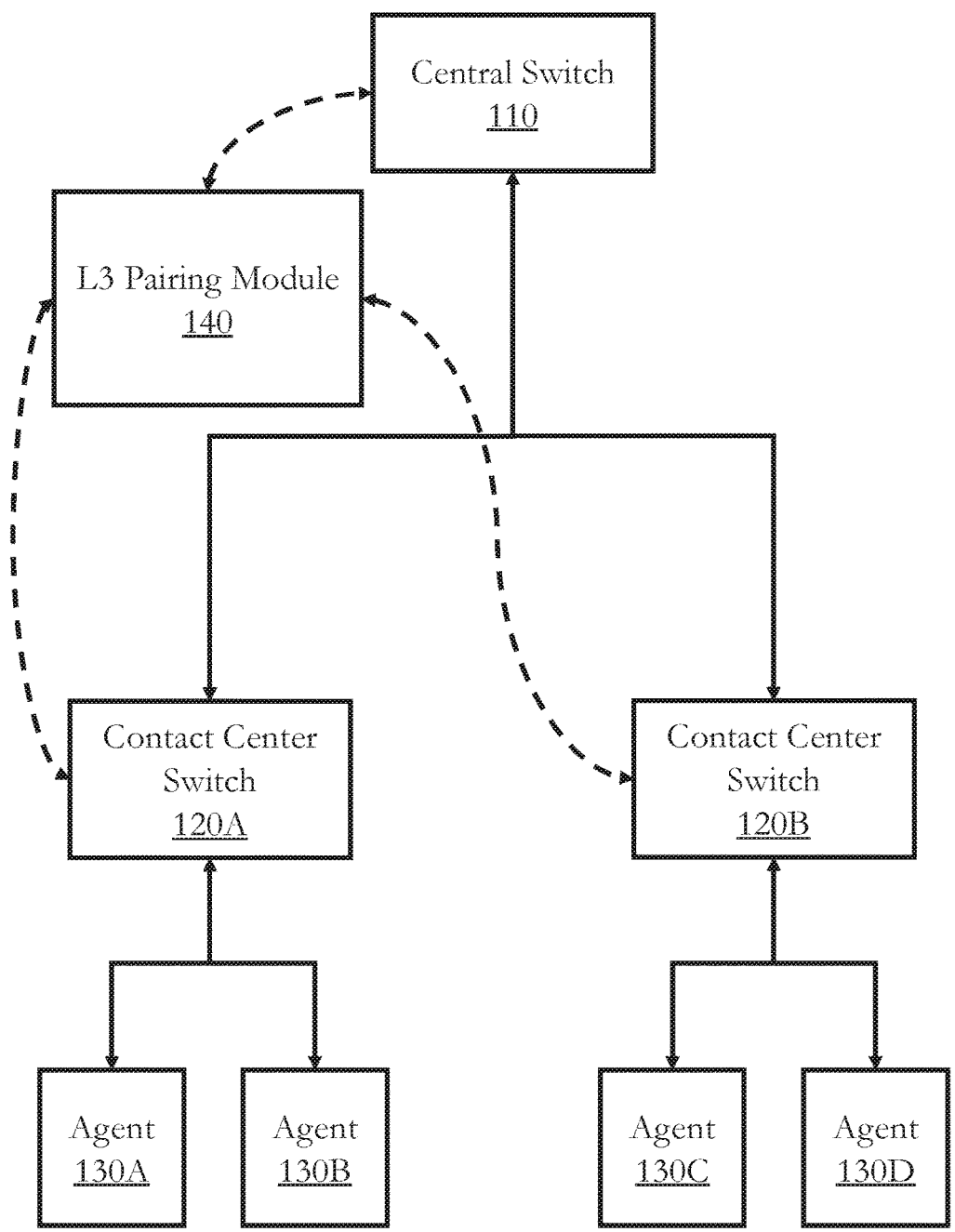
FIG. 1 shows a block diagram of a contact center according to embodiments of the present disclosure.

FIG. 1 shows a block diagram of a contact center system 100 according to embodiments of the present disclosure. The description herein describes network elements, computers, and/or components of a system and method for simulating contact center systems that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

As shown in FIG. 1, the contact center system 100 may include a central switch 110. The central switch 110 may receive incoming contacts (e.g., callers) or support outbound connections to contacts via a telecommunications network (not shown). The central switch 110 may include contact routing hardware and software for helping to route contacts among one or more contact centers, or to one or more PBX/ACDs or other queuing or switching components, including other Internet-based, cloud-based, or otherwise networked contact-agent hardware or software-based contact center solutions.

The central switch 110 may not be necessary such as if there is only one contact center, or if there is only one PBX/ACD routing component, in the contact center system 100. If more than one contact center is part of the contact center system 100, each contact center may include at least one contact center switch (e.g., contact center switches 120A and 120B). The contact center switches 120A and 120B may be communicatively coupled to the central switch 110. In embodiments, various topologies of routing and network components may be configured to implement the contact center system.

Each contact center switch for each contact center may be communicatively coupled to a plurality (or "pool") of agents. Each contact center switch may support a certain number of agents (or "seats") to be logged in at one time. At any given time, a logged-in agent may be available and waiting to be connected to a contact, or the logged-in agent may be unavailable for any of a number of reasons, such as being connected to another contact, performing certain post-call functions such as logging information about the call, or taking a break.

In the example of FIG. 1, the central switch 110 routes contacts to one of two contact centers via contact center switch 120A and contact center switch 120B, respectively. Each of the contact center switches 120A and 120B are shown with two agents each. Agents 130A and 130B may be logged into contact center switch 120A, and agents 130C and 130D may be logged into contact center switch 120B.

The contact center system 100 may also be communicatively coupled to an integrated service from, for example, a third party vendor. In the example of FIG. 1, L3 pairing module 140 may be communicatively coupled to one or more switches in the switch system of the contact center system 100, such as central switch 110, contact center switch 120A, or contact center switch 120B. In some embodiments, switches of the contact center system 100 may be communicatively coupled to multiple L3 pairing modules. In some embodiments, L3 pairing module 140 may be embedded within a component of a contact center system (e.g., embedded in or otherwise integrated with a switch). The L3 pairing module 140 may receive information from a switch (e.g., contact center switch 120A) about agents logged into the switch (e.g., agents 130A and 130B) and about incoming contacts via another switch (e.g., central switch 110) or, in some embodiments, from a network (e.g., the Internet or a telecommunications network) (not shown).

A contact center may include multiple pairing modules (e.g., a BP module and a FIFO module) (not shown), and one or more pairing modules may be provided by one or more different vendors. In some embodiments, one or more pairing modules may be components of L3 pairing module 140 or one or more switches such as central switch 110 or contact center switches 120A and 120B. In some embodiments, an L3 pairing module may determine which pairing module may handle pairing for a particular contact. For example, the L3 pairing module may alternate between enabling pairing via the BP module and enabling pairing with the FIFO module. In other embodiments, one pairing module (e.g., the BP module) may be configured to emulate other pairing strategies. For example, an L3 pairing module, or an L3 pairing component integrated with BP components in the BP module, may determine whether the BP module may use BP pairing or emulated FIFO pairing for a particular contact. In this case, "BP on" may refer to times when the BP module is applying the BP pairing strategy, and "BP off" may refer to other times when the BP module is applying a different pairing strategy (e.g., FIFO).

In some embodiments, regardless of whether pairing strategies are handled by separate modules, or if some pairing strategies are emulated within a single pairing module, the single pairing module may be configured to monitor and store information about pairings made under any or all pairing strategies. For example, a BP module may observe and record data about FIFO pairings made by a FIFO module, or the BP module may observe and record data about emulated FIFO pairings made by a BP module operating in FIFO emulation mode.

Figure 2:
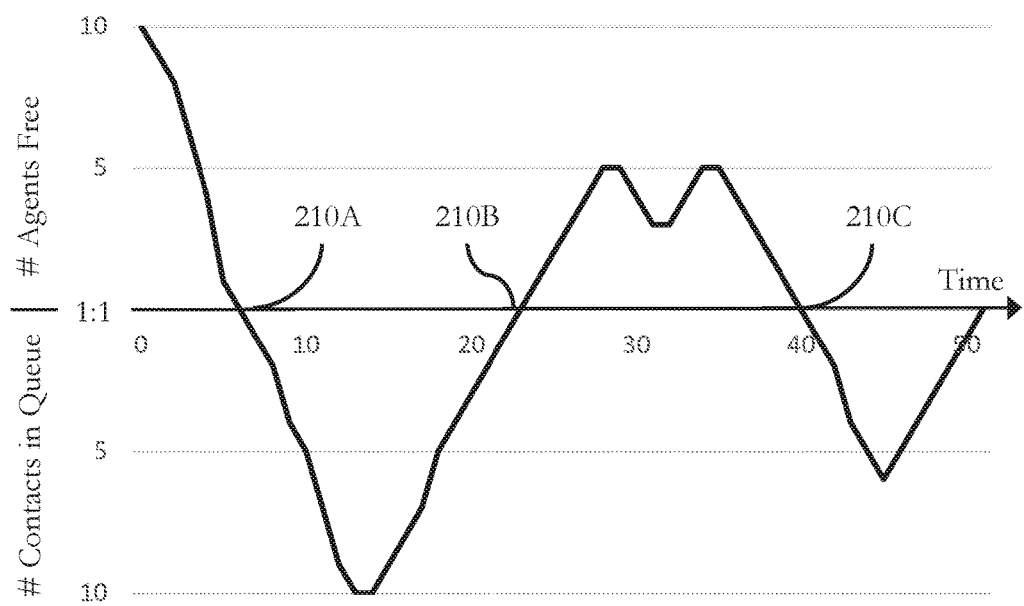
FIG. 2 depicts a schematic representation of a contact center system timeline according to embodiments of the present disclosure.

FIG. 2 depicts a schematic representation of a contact center system timeline according to embodiments of the present disclosure. In a given period of time (e.g., over several minutes, several hours, a day), the number of agents free or available to connect to contacts, or the number of contacts waiting in queue, will vary continuously as contacts arrive and depart the contact center system. The example of FIG. 2 depicts the capacity of a contact center system over a period of time along the x-axis from time "0" to time "50" (e.g., 0 minutes to 50 minutes). The y-axis depicts the number of free agents or the number of contacts in queue above and below the x-axis, respectively.

At time 0 (e.g., when the contact center first opens at the beginning of the day), there are 10 agents available and waiting for contacts to arrive. Periods of time when a contact center has a surplus of available agents are referred to as "L1" environments. If a choice-based pairing strategy such as BP is used, the choice-based pairing strategy may choose from among any (or a subset) of the available agents when a contact arrives.

As contacts arrive, and agents become occupied while communicating with those contacts, the number of available agents may decrease, as shown in FIG. 2 from time 0 to approximately time 5. The contact center is operating in an L1 environment for this entire duration, but the choice available to BP or another choice-based pairing strategy becomes increasingly limited-instead of having as many as ten (or more) agents available to choose among, by about time 5 there are only two or three agents to choose among.

At other periods of time, there may be a shortage of agents, and contacts begin to queue, waiting for agents to become available for connection, as shown in FIG. 2 from about time 7 to about time 21. Periods of time when a contact center has a shortage of available agents are referred to as "L2" environments. If a choice-based pairing strategy such as BP is used, the choice-based pairing strategy may choose from among any (or a subset) of the waiting contacts when an agent becomes available.

As agents become available to connect with contacts waiting in the queue, the size of the queue may decrease, as shown in FIG. 2 from approximately time 14 to about time 21. The contact center is operating in an L2 environment for this entire duration, but the choice available to BP or another choice-based pairing strategy becomes increasingly limited-instead of having as many as ten (or more) contacts available to choose among at about time 14, by about time 21 there are only two or three contacts in queue to choose among.

At some points in time, a contact center will transition from an L1 state to an L2 state (e.g., point 210A at about time 6 and point 210C at about time 40) or vice versa, from an L2 state to an L1 state (e.g., point 210B at about time 23). These crossover points along the x-axis (labeled the "1:1" line) occur when no choice is available to BP or another choice-based pairing strategy. For example, there may be a single contact waiting in queue, which may be paired with whichever agent happens to become free next. Or there may be a single agent waiting idle, which may be paired with whichever contact happens to arrive at the contact center next.

In some situations (not shown), a contact center may reach the "1:1" line and then bounce back up into L1 (or bounce back down into L2). No L1-to-L2 or L2-to-L1 transition occurs, but there is still a time at which no choice is available to BP.

In some situations (not shown), a contact center may remain along the "1:1" line for an extended period of time. In fact, a typical contact center may consider this line to indicate when the contact center is operating at a "perfect" capacity, with neither a surplus nor a shortage of agents for the given level of demand (e.g., number, frequency, and duration of contacts arriving at the contact center). In these situations, a BP pairing strategy could go for an extended period of time with no choices available other than the "1 agent:1 contact" default choice.

These points in time (or periods of time) when the contact center is operating along the "1:1" line, when a contact center has neither a surplus nor a shortage of available agents, are referred to as "L0" environments.

Figure 3:
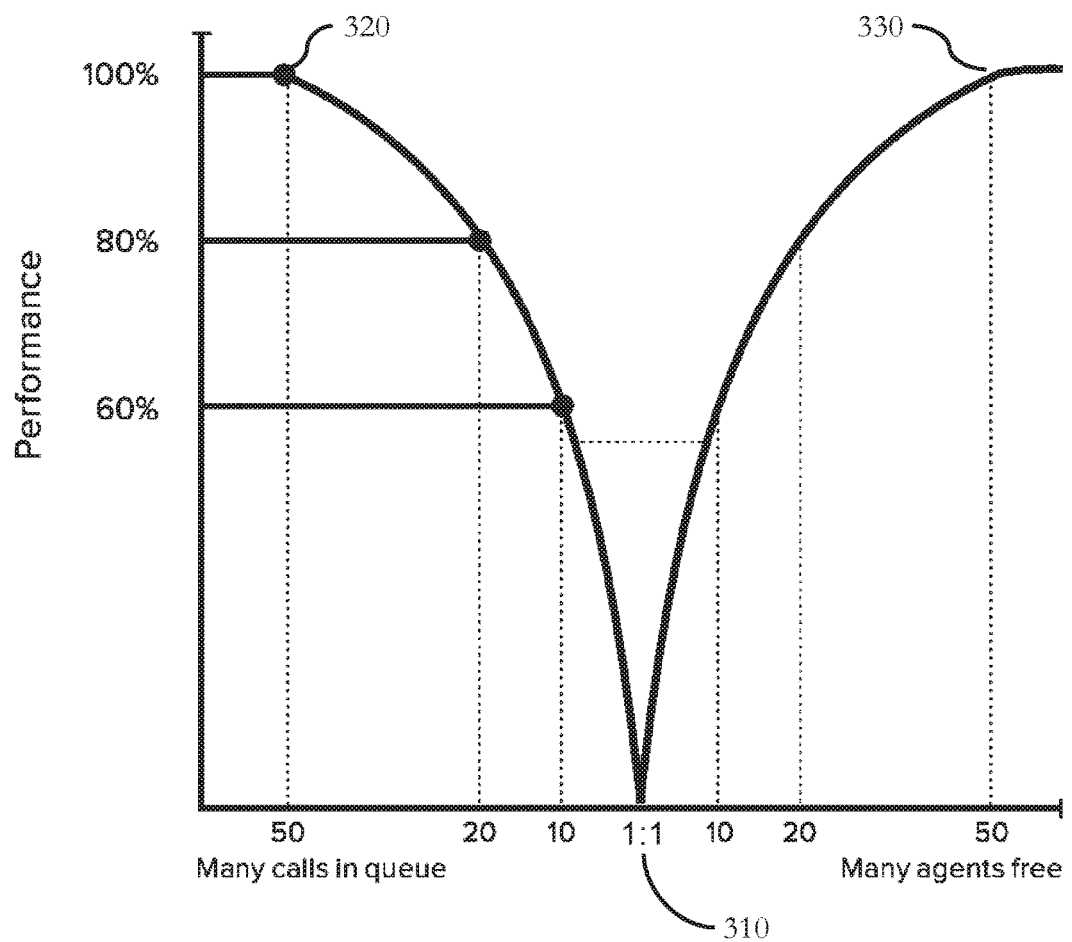
FIG. 3 depicts a schematic representation of a choice-based pairing strategy according to embodiments of the present disclosure.

FIG. 3 depicts a schematic representation of a choice-based pairing strategy according to embodiments of the present disclosure. When choice is limited, choice-based pairing strategies may suffer from suboptimal performance. FIG. 3 shows an example of a performance estimate or performance simulation of a choice-based pairing strategy. When there are many contacts in queue ("calls in queue" as in FIG. 3) (e.g., at point 320), or when there are many agents free (e.g., at point 330), BP or another choice-based pairing strategy may perform optimally (e.g., at or near "100%" instant performance or efficiency).

However, as the number of contacts in queue or free agents dwindle, there are fewer choices available to BP, and the performance or efficiency of BP could drop. In an L0 environment (e.g., at point 310), the instant performance or efficiency of BP is considered to be 0%, insofar as BP (without L3 pairing) is incapable of making a choice different from the pairing that any other non-L3 pairing strategy could make. In other words, if there is only one contact waiting for an agent, and only one agent waiting a contact, both FIFO and BP will pair that one contact with that one agent, with no other choice to make. As choice increases, either as contacts fill a queue in an L2 environment, or more agents become available in an L1 environment, performance steadily increases toward optimal instant performance.

In the example of FIG. 3, 50 calls in queue and 50 agents free are the points 320 and 330 at which this pairing strategy is expected to reach peak performance. However, in other embodiments or real-world contact center systems, peak performance may be reached at varying levels of agent shortage or surplus (e.g., greater than 3 choices available, greater than 7 choices available, greater than 20 choices available, etc.).

In situations such as L0 environments in which the choice available to BP is too limited, it may be advantageous to delay or otherwise postpone connecting an agent to a contact. Introducing a delay could allow time for another agent or another contact to become available. If a contact center is operating in L0, and another agent arrives, the contact center will enter an L1 environment with two agents to choose between instead of being forced into the default selection. Similarly, if a contact center is operating in L0, and another agent arrives, the contact center will enter an L2 environment with two contacts to choose between instead of being forced into the default selection.

In some embodiments, it may be desirable to delay even if the contact center already has some choice (e.g., already operating in L1 or L2), but the choice is limited. For example, if only ten contacts are waiting in queue when an agent becomes available, the pairing strategy of FIG. 3 is expected to have an instant performance of only 60%. It may be desirable to delay until closer to twenty contacts are waiting, at which point the expected instant performance would be closer to 80%.

When a delay is permitted, it is possible to enter a hybrid environment that is neither pure L1 nor pure L2. For example, consider a contact center in which there are two contacts in queue, and only one agent is available. Following a delay, a second agent could become available, resulting in an environment in which there are multiple contacts in queue and multiple agents available for connection. Periods of time when a contact center has multiple contacts in queue and multiple free agents are referred to as "L3" environments. In the present disclosure, an L3 pairing module is a pairing module capable of causing and handling L3 environments within a contact center system.

Figure 4:
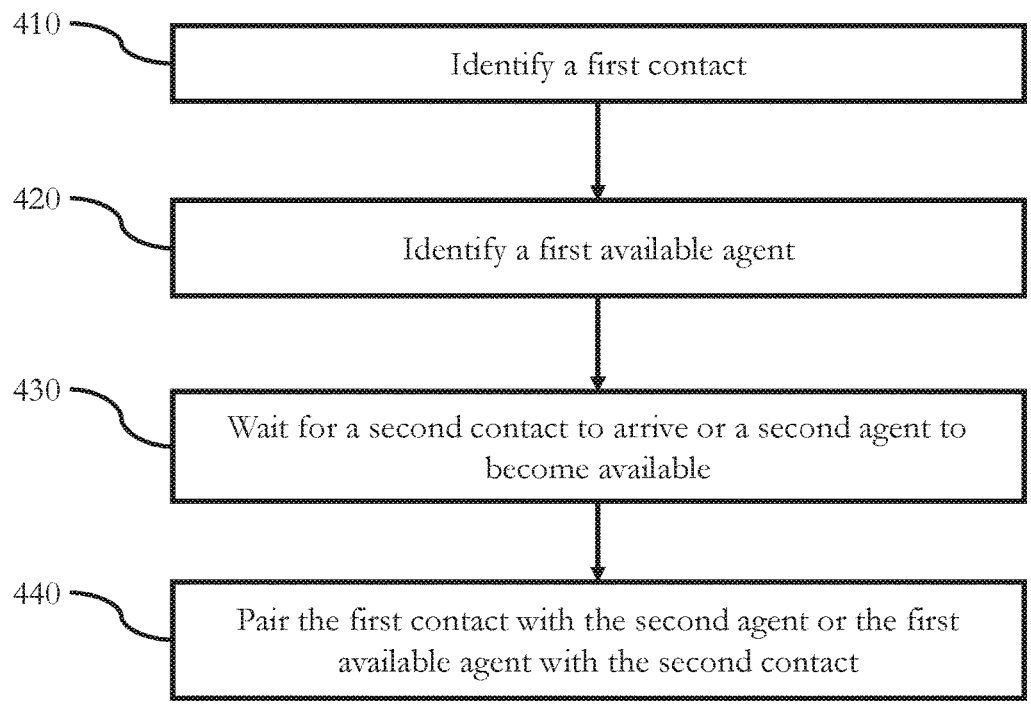
FIG. 4 shows a flow diagram of an L3 pairing method according to embodiments of the present disclosure.

FIG. 4 shows a flow diagram of an L3 pairing method 400 according to embodiments of the present disclosure. At block 410, a first contact in queue may be identified. In L0 and L1 environments, the first contact may be the only contact waiting in queue.

At block 420, a first available agent may be identified. In L0 and L2 environments, the first available agent may be the only available agent.

At this point, a typical contact center may connect the first contact with the first agent. If the contact center is using a choice-based pairing strategy such as BP, this connection may be suboptimal, and the choice-based pairing strategy will operate at low instant performance or efficiency. Instead, at block 430, the L3 pairing method 400 may wait for a second contact to arrive or a second agent to become available, thereby increasing the amount of choice available to BP or another choice-based pairing strategy. In some situations, this waiting or delay step may result in a contact center that is operating in an L3 environment.

In some embodiments, the L3 pairing method may wait at block 430 for a threshold amount of time, during which more than one contact may arrive or more than one agent may become available. In other embodiments, the L3 pairing method may wait at block 430 for up to a maximum amount of time, after which it makes a connection regardless of whether or how much additional choice was made available to the pairing strategy.

At block 440, a choice of pairing may be made. In embodiments where the second contact has arrived, the first available agent may be preferably paired with a selected one of at least the first and second contacts. In situations where the second agent has become available, the first contact may be preferably paired with a selected one of at least the first and second agents. In situations where there are multiple agents and multiple contacts (L3), a selected one of at least the first and second agent may be preferably paired with a selected one of at least the first and second contact.

Figure 5:
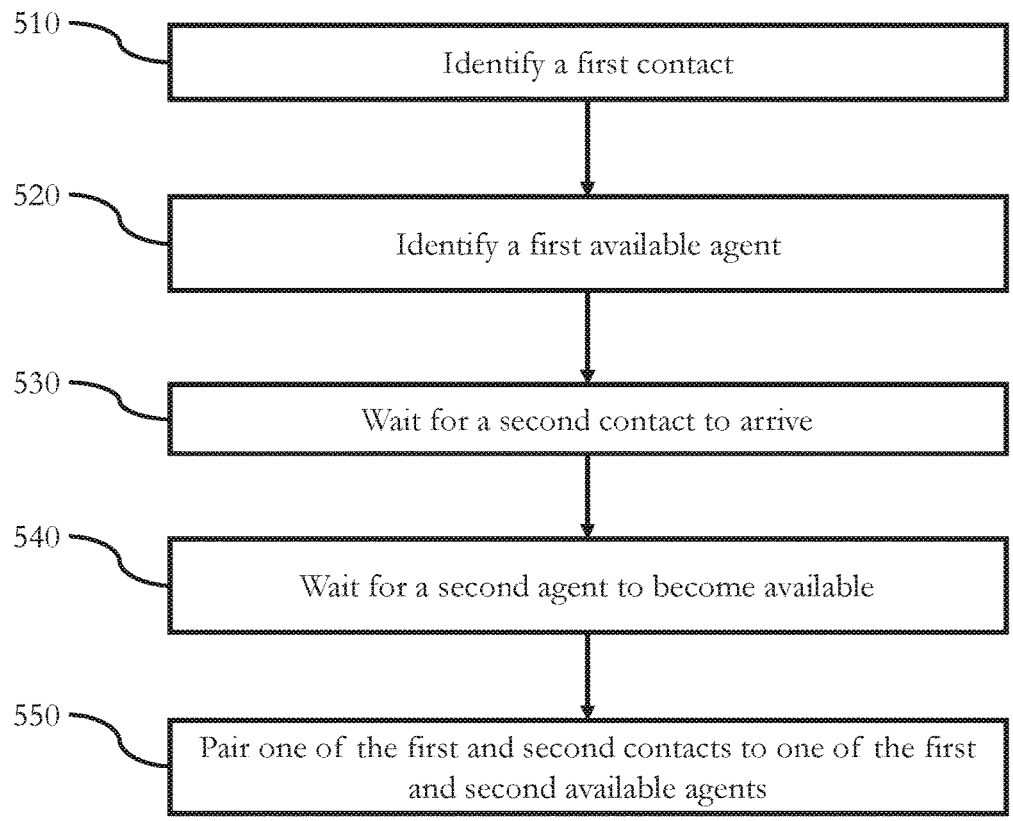
FIG. 5 shows a flow diagram of an L3 pairing method according to embodiments of the present disclosure.

FIG. 5 shows a flow diagram of an L3 pairing method 500 according to embodiments of the present disclosure. L3 pairing method 500 is similar to L3 pairing method 400 (FIG. 4) insofar as it uses a delay mechanism to increase choice. However, whereas pairing method 400 can result in an L3 environment, pairing method 500 compels an L3 environment.

At block 510, a first contact may be identified.
At block 520, a first available agent may be identified.
At block 530, L3 pairing method 500 may wait for a second contact to arrive, and, at block 540, L3 pairing method 500 may wait for a second agent to arrive, resulting in an L3 environment, in which multiple agents and multiple contacts are available for pairing.

At block 550, in some embodiments, a selected one of at least the first and second contacts may be paired to a selected one of at least the first and second agents. In other embodiments, BP may "batch" pairings, such as by pairing both the first agent with one of the first and second contacts, and the second agent with the other of the first and second contacts. In this way, BP may make multiple high-performance/efficiency pairings at once without further delay. In some embodiments, the contact center system may be able to effect each of these pairings/connections simultaneously, or nearly simultaneously, such as by a single batch instruction from an L3 pairing module. In other embodiments, the L3 pairing module may serialize multiple pairing/connection instructions to effect each of these multiple pairings. The serialized instructions may be made nearly simultaneously such that there is no delay or only minimal delay between routing one connection and the next.

In some embodiments, L3 pairing method 400 described above with respect to FIG. 4 may also be configured to perform batch pairings in situations in which an L3 environment arises.

It is possible for L3 environments to arise without introducing a delay or postponing selecting/choosing a pairing. For example, two or more agents may become available simultaneously or nearly simultaneously when there are multiple contacts in queue, resulting in a transition from L2 to L3. Similarly, two or more contacts may arrive simultaneously or nearly simultaneously, resulting in a transition from L1 to L3. In some contact center systems, the workforce may be instantaneously increased. For example, if there are many contacts waiting in queue, the contact center may modify the pool of logged-in agents to add more than one agent to the pool. Each of these newly-added agents would be available simultaneously or nearly simultaneously, resulting in a transition from L2 to L3.

Figure 6:
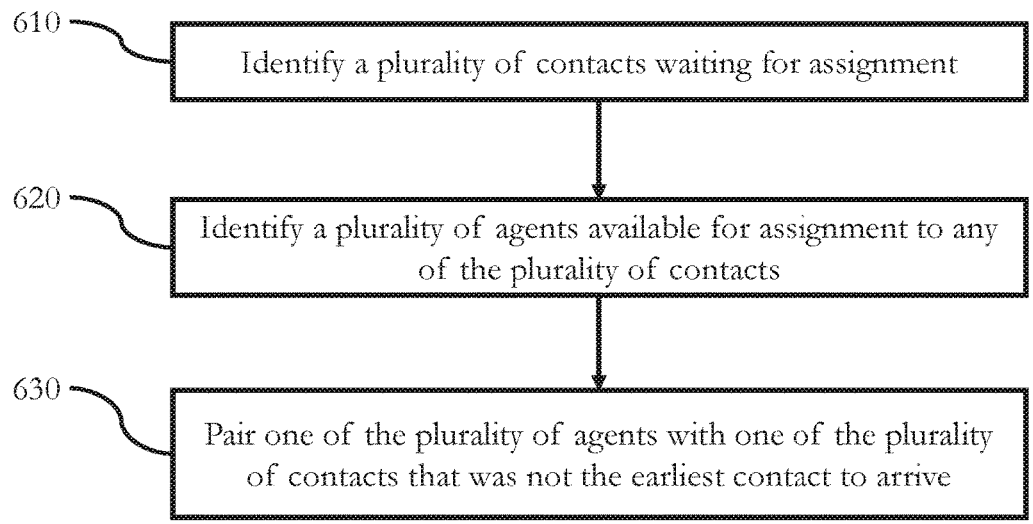
FIG. 6 shows a flow diagram of an L3 pairing method according to embodiments of the present disclosure.

FIG. 6 shows a flow diagram of an L3 pairing method 600 according to embodiments of the present disclosure. At block 610, a plurality of contacts waiting in queue for assignment may be identified. At block 620, a plurality of agents available for assignment to any (or at least some) of the plurality of contacts may be identified.

Consequently, the contact center is currently in an L3 environment, regardless of whether it was achieved through a delay technique or other circumstances that gave rise to L3. At block 630, in some embodiments, one of the plurality of agents may be paired with one of the plurality of contacts that was not the earliest contact to arrive. In some embodiments, the L3 pairing method 600 may batch-pair multiple agents with multiple contacts, and in some situations it may be the case that none of the preferentially paired contacts was the earliest contact to arrive.

Similarly, in some embodiments, one of the plurality of contacts may be paired with one of the plurality of agents that was not the longest-waiting agent (or best-performing agent) that would have been selected according to a FIFO-based fairness metric (or PBR strategy). In some embodiments, the L3 pairing method 600 may batch-pair multiple contacts with multiple agents, and in some situations it may be the case none of the preferentially paired agents was the longest-waiting agent (or best-performing agent, etc.).

It is possible for an L3 pairing module to perform or otherwise emulate a FIFO or FIFO-like pairing strategy while the contact center system is an L3 state. In these situations, the L3 pairing module may always pair, for example, the longest-waiting contact (or the higher-priority contact) at the head of the queue with, for example, the longest-waiting agent, regardless of the other contacts in queue and available agents. In this sense, a FIFO pairing strategy is indifferent to L1 (agent surplus), L2 (agent shortage), and L3 (multiple agents and multiple contacts) environments, operating no more or less efficiently as in an L0 state. However, an L3-enabled choice-based pairing strategy such as BP with L3 can operate at higher average performance/efficiency when L1/L2/L3 states with increased choice are possible.

In some embodiments, an L3 pairing module (e.g., L3 pairing module 140) or a similar module may be capable of making an automated workforce management recommendation or decision within the contact center system. For example, instead of preferentially trying to minimize contact hold time and agent free time, which causes the contact center to hover around L0 or in periods of L1 and L2 with limited amounts of choice, the contact center system could be advised or instructed to use a certain number of agents that is likely to keep the contact center system in high-choice environments. In some situations, the recommendation could be to staff additional agents (e.g., 10 additional agents, 100 additional agents, etc.) to increase the expected amount of time spent in high-choice L1. In other situations, the recommendation could be to staff fewer agents (e.g., 10 fewer agents, 100 fewer agents, etc.) to increase the expected amount of time spent in high-choice L2.

In some embodiments, the workforce management instruction or recommendation may balance the cost of employing additional agents and increasing agent free time against the benefit of reducing contact wait time, or balancing the cost-savings of employing fewer agents and decreasing agent free time against the cost of increasing contact wait time. These recommendations may take into account the desired metric to optimize. For example, if the contact center management desires to optimize customer satisfaction, it may desirable to make a recommendation that errs on being in high-choice L1 (agent surplus) rather than high-choice L2 (agent shortage). In either case, the recommendation or instruction may balance the cost of increasing agent free time or increasing contact wait time against the improved performance/efficiency of BP or another choice-based pairing strategy operating in higher-choice L1, L2, or L3 environments, and avoiding inefficient L0 environments in which only a default choice is available.

At this point it should be noted that L3 pairing in a contact center system in accordance with the present disclosure as described above may involve the processing of input data and the generation of output data to some extent. This input data processing and output data generation may be implemented in hardware or software. For example, specific electronic components may be employed in an L3 pairing module or similar or related circuitry for implementing the functions associated with L3 pairing in a contact center system in accordance with the present disclosure as described above. Alternatively, one or more processors operating in accordance with instructions may implement the functions associated with BP in a contact center system in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for L3 pairing in a contact center system comprising:
   determining, by at least one computer processor communicatively coupled to and configured to operate in the contact center system, a minimum number of agents available to select from;
   determining, by the at least one computer processor, a maximum amount of time to wait before making an agent selection;
   postponing agent selection, by the at least one computer processor, until at least one of the following conditions is satisfied:
      (a) the maximum amount of time has elapsed; or
      (b) the minimum number of agents has been reached;
   selecting, by the at least one computer processor using a pairing strategy, an agent among one or more agents for connection to an available contact within the contact center system to optimize performance of the contact center system, wherein the optimized performance of the contact center system is attributable to the pairing strategy; and
   outputting, by the at least one computer processor, the selection of the agent for pairing with the available contact for connection within the contact center system.

2. The method of claim 1, wherein the maximum amount of time is less than 30 seconds.

3. The method of claim 1, wherein the minimum number of agents is greater than three available agents.

4. The method of claim 1, wherein selecting the agent comprises applying a behavioral pairing strategy.

5. The method of claim 1, wherein the available contact is one contact of a plurality of contacts waiting for assignment to an agent.

6. A method for L3 pairing in a contact center system comprising:
   determining, by at least one computer processor communicatively coupled to and configured to operate in the contact center system, a minimum number of contacts available to select from;
   determining, by the at least one computer processor, a maximum amount of time to wait before making a contact selection;
   postponing contact selection, by the at least one computer processor, until at least one of the following conditions is satisfied:
      (a) the maximum amount of time has elapsed; or
      (b) the minimum number of contacts has been reached;
   selecting, by the at least one computer processor using a pairing strategy, a contact among one or more contacts for connection to an available agent within the contact center system to optimize performance of the contact center system, wherein the optimized performance of the contact center system is attributable to the pairing strategy; and
   outputting, by the at least one computer processor, the selection of the contact for pairing with the available agent for connection within the contact center system.

7. The method of claim 6, wherein the maximum amount of time is less than 30 seconds.

8. The method of claim 6, wherein the minimum number of contacts is greater than three contacts waiting for assignment.

9. The method of claim 6, wherein selecting the contact comprises applying a behavioral pairing strategy.

10. The method of claim 6, wherein the available agent is one agent of a plurality of agents waiting for assignment to a contact.

11. A method for L3 pairing in a contact center system comprising:
   determining, by at least one computer processor communicatively coupled to and configured to operate in the contact center system, a maximum amount of time to wait before making a pairing selection;
   determining, by the at least one computer processor, a first score of a first preferred pairing between a first agent and a first contact;
   awaiting arrival of at least a second agent or at least a second contact that results in an emergence of a second preferred pairing having a second score that is higher than the first score;
   postponing pairing selection, by the at least one computer processor, until at least one of the following conditions is satisfied:
      (a) the maximum amount of time has elapsed; or
      (b) arrival of the at least a second agent or the at least a second contact that results in the emergence of the second preferred pairing;
   selecting, by the at least one computer processor using a pairing strategy, the second preferred pairing for connection within the contact center system to optimize performance of the contact center system, wherein the optimized performance of the contact center system is attributable to the pairing strategy; and
   outputting, by the at least one computer processor, the selection of the second preferred pairing for connection within the contact center system.

12. The method of claim 11, wherein the maximum amount of time is less than 30 seconds.

13. The method of claim 11, wherein determining the first and second preferred pairings comprises applying a behavioral pairing strategy.

14. The method of claim 11, wherein arrival of the second agent and the second contact results in the emergence of the second preferred pairing consisting of the second agent and the second contact.

15. The method of claim 11, wherein arrival of the second agent results in the emergence of the second preferred pairing consisting of the second agent and the first contact.

16. The method of claim 11, wherein arrival of the second contact results in the emergence of the second preferred pairing consisting of the second contact and an agent different from the first agent that was already available.

17. A system for L3 pairing in a contact center system comprising:

at least one computer processor communicatively coupled to and configured to operate in the contact center system, wherein the at least one computer processor is further configured to:

determine a minimum number of agents available to select from;

determine a maximum amount of time to wait before making an agent selection;

postpone agent selection until at least one of the following conditions is satisfied:
(a) the maximum amount of time has elapsed; or
(b) the minimum number of agents has been reached;

select, using a pairing strategy, an agent among one or more agents for connection to an available contact within the contact center system to optimize performance of the contact center system, wherein the optimized performance of the contact center system is attributable to the pairing strategy; and output the selection of the agent for pairing with the available contact for connection within the contact center system.

18. The system of claim 17, wherein the minimum number of agents is greater than three available agents.

19. The system of claim 17, wherein selecting the agent comprises applying a behavioral pairing strategy.

20. The system of claim 17, wherein the available contact is one contact of a plurality of contacts waiting for assignment to an agent.

21. At least one non-transitory computer processor readable storage medium storing a computer program of instructions configured to be readable by at least one processor for instructing the at least one processor to execute a computer process for performing the method as recited in claim 1.

22. At least one non-transitory computer processor readable storage medium storing a computer program of instructions configured to be readable by at least one processor for instructing the at least one processor to execute a computer process for performing the method as recited in claim 6.

23. At least one non-transitory computer processor readable storage medium storing a computer program of instructions configured to be readable by at least one processor for instructing the at least one processor to execute a computer process for performing the method as recited in claim 11.

* * * * *